(12) United States Patent
Kim (10) Patent No.: US 12,368,342 B2
(45) Date of Patent: Jul. 22, 2025

(54) MOTOR

(71) Applicant: LG Innotek Co., Ltd., Seoul (KR)

(72) Inventor: Hong Hyoun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 252 days.

(21) Appl. No.: 18/253,253

(22) PCT Filed: Nov. 16, 2021

(86) PCT No.: PCT/KR2021/016711
§ 371 (c)(1),
(2) Date: May 17, 2023

(87) PCT Pub. No.: WO2022/108292
PCT Pub. Date: May 27, 2022

(65) Prior Publication Data
US 2024/0006955 A1 Jan. 4, 2024

(30) Foreign Application Priority Data
Nov. 17, 2020 (KR) .................. 10-2020-0153329

(51) Int. Cl.
| | | |
|---|---|---|
| H02K 7/00 | (2006.01) | |
| H02K 1/27 | (2022.01) | |
| H02K 5/15 | (2006.01) | |
| H02K 5/16 | (2006.01) | |
| H02K 5/22 | (2006.01) | |
| H02K 7/08 | (2006.01) | |

(52) U.S. Cl.
CPC .............. *H02K 7/003* (2013.01); *H02K 1/27* (2013.01); *H02K 5/15* (2013.01); *H02K 5/16* (2013.01); *H02K 5/225* (2013.01); *H02K 7/08* (2013.01)

(58) Field of Classification Search
CPC ............ H02K 7/003; H02K 1/27; H02K 5/15; H02K 5/16; H02K 5/225; H02K 7/08
See application file for complete search history.

(56) References Cited

U.S. PATENT DOCUMENTS

| | | | |
|---|---|---|---|
| 6,091,173 A | 7/2000 | Byrd | |
| 9,653,970 B2 * | 5/2017 | Reed | .................. H02K 11/028 |
| 10,404,130 B2 * | 9/2019 | Thalfah | .................. H02K 5/163 |

FOREIGN PATENT DOCUMENTS

| | | |
|---|---|---|
| CN | 205792126 U | 12/2016 |
| JP | 61-176948 U | 11/1986 |
| JP | 2007078430 A | 3/2007 |
| JP | 2008219995 A | 9/2008 |

OTHER PUBLICATIONS

International Search Report, dated Feb. 23, 2022, in PCT Application No. PCT/KR2021/016711.

* cited by examiner

*Primary Examiner* — Terrance L Kenerly
(74) *Attorney, Agent, or Firm* — Saliwanchik, Lloyd & Eisenschenk (57) ABSTRACT

The present invention can provide a motor including a shaft, a bearing which supports the shaft, a shield including a first hole through which the shaft passes, and a base including a second hole through which the shaft passes, wherein the shield includes a first region disposed in the base and a second region extending from the first region, protruding outward from the base, and having the first hole, and the bearing is disposed in the first hole.

10 Claims, 11 Drawing Sheets

MOTOR

CROSS-REFERENCE TO RELATED APPLICATIONS

This application is the U.S. national stage application of International Patent Application No. PCT/KR2021/016711, filed Nov. 16, 2021, which claims the benefit under 35 U.S.C. § 119 of Korean Application No. 10-2020-0153329, filed Nov. 17, 2020, the disclosures of each of which are incorporated herein by reference in their entirety.

TECHNICAL FIELD

The present invention relates to a motor.

BACKGROUND ART

Generally, in a motor, a rotor rotates due to an electromagnetic interaction between a rotor and a stator. In this case, a shaft connected to the rotor also rotates to generate a rotational driving force.

The rotor and the stator are accommodated in a housing. The housing is a hollow cylindrical member. One side of the housing is open. A bearing housing covers the open one side of the housing. The bearing housing includes a bearing.

After the bearing is seated in the bearing housing, caulking is performed to fix the bearing to the bearing housing. Additionally, after a shield is seated in the bearing housing, caulking may be performed to fix the shield to the bearing housing. The bearing housing may be formed of an aluminum material in a die casting manner.

However, such a bearing housing structure has a problem that the manufacturing process is complex.

DISCLOSURE

Technical Problem

Accordingly, the present invention is intended to address the above problems and directed to providing a motor which has a simple structure of a bearing housing and of which a manufacturing process is simple.

Objectives to be achieved through the present invention are not limited to the above-described objectives, and other objectives which are not described above will be clearly understood by those skilled in the art through the following descriptions.

Technical Solution

One aspect of the present invention provides a motor including a shaft, a bearing which supports the shaft, a shield including a first hole through which the shaft passes, and a base including a second hole through which the shaft passes, wherein the shield includes a first region disposed in the base and a second region extending from the first region, protruding outward from the base, and having the first hole, and the bearing is disposed in the first hole.

Another aspect of the present invention provides a motor including a shaft, a bearing which supports the shaft, a shield in which the bearing is disposed, and a base into which at least a part of the shield is inserted, wherein the shield includes a flange inserted into the base and a first protrusion protruding from the flange, and the bearing includes an outer circumferential surface in contact with an inner surface of the first protrusion and a first surface of which at least a part is in contact with the base.

Still another aspect of the present invention provides a motor including a shaft, a bearing which supports the shaft, a shield including a first hole in which the bearing is disposed, and a molding part to which at least a part of the shield is molded, wherein the molding part includes a third region in contact with a part of the bearing and a second hole through which the shaft passes and which has a diameter smaller than a diameter of the first hole.

Advantageous Effects

According to an embodiment, there is an advantage that a structure of a base and a manufacturing process are simple.

According to an embodiment, since a column of a bearing housing is positioned inside a sixth hole of a shield, there is an advantage that a coupling force between a shield and a base is high.

According to an embodiment, since a third protrusion of a base guides a busbar, there are advantages of improving assemblability of the base and the busbar and easily aligning a position of the busbar.

According to an embodiment, since a rib is disposed on an outer circumferential surface of a base formed of resin and the rib is press-fitted into an inner circumferential surface of a housing, there is an advantage that caulking or a separate fastening structure for coupling the base and the housing can be omitted.

MODES OF THE INVENTION

A direction parallel to a longitudinal direction (vertical direction) of a shaft is referred to as an axial direction, a direction perpendicular to the axial direction from the shaft is referred to as a radial direction, and a direction along a circle having a radius in the radial direction from the shaft is referred to as a circumferential direction.

Figure 1:
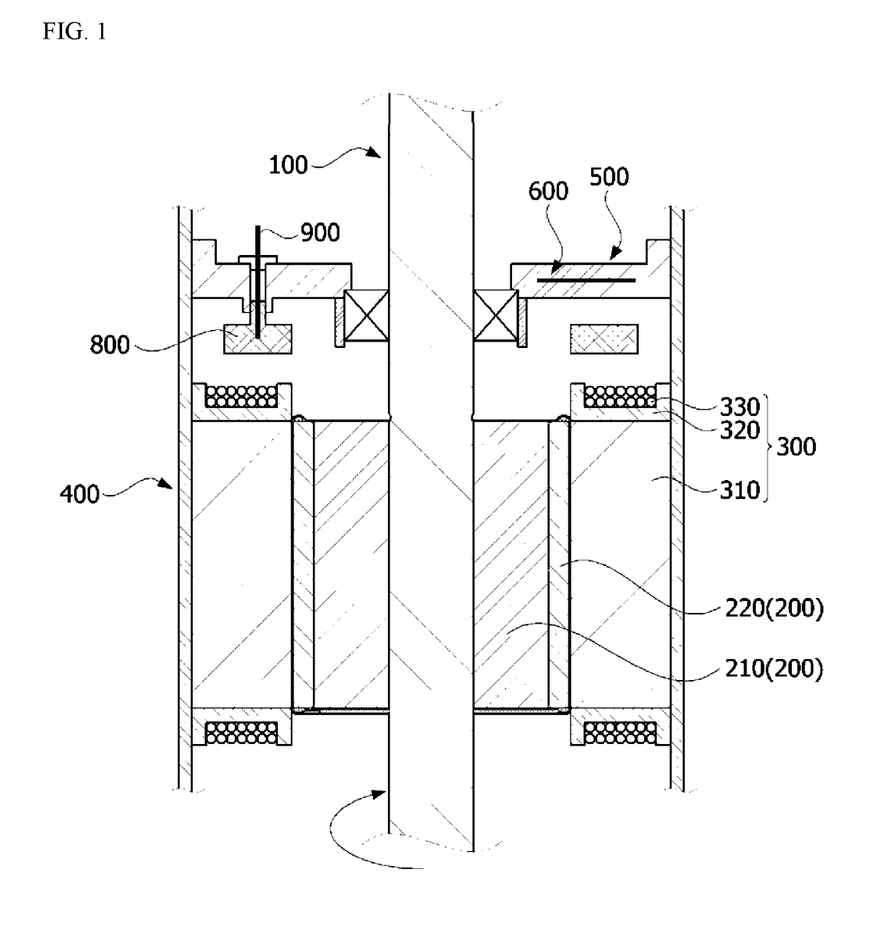
FIG. 1 is a side cross-sectional view illustrating a motor according to an embodiment.

FIG. 1 is a side cross-sectional view illustrating a motor according to an embodiment.

Referring to FIG. 1, the motor according to the embodiment may include a shaft 100, a rotor 200, a stator 300, a bearing 400, a base 500, a shield 600, a terminal holder 700, a busbar holder 800, a busbar 900, and a housing 1000. Hereinafter, the term "inward" refers to a direction from the housing 1000 toward the shaft 100 which is a center of the motor, and the term "outward" refers to a direction opposite to "inward," that is, a direction from the shaft 100 toward the housing 1000.

The shaft 100 may be coupled to the rotor 200. When a current is supplied, and an electromagnetic interaction between the rotor 200 and the stator 300 occurs, the rotor 200 rotates, and the shaft 100 rotates in conjunction with the rotor 200. The shaft 100 may be formed of a hollow member.

The rotor 200 rotates due to an electrical interaction with the stator 300. The rotor 200 may be disposed to correspond to the stator 300 and may be disposed inside the stator 300. The rotor 200 may include a rotor core 210 and a magnet 220. The magnet 220 may be attached to an outer surface of the rotor core 210 or included in the rotor core 210.

The stator 300 is disposed outside the rotor 200. The stator 300 may include a stator core 310, an insulator 320, and a coil 330. The insulator 320 is seated on the stator core 310. The coil 330 is mounted on the insulator 320. The coil 330 induces an electrical interaction with the magnets 220 of the rotor 200.

The bearing 400 rotatably supports the shaft 100.

The base 500 includes a bearing 400. The base 500 covers an open one side of the housing 1000.

The shield 600 serves to block a magnetic flux line generated by the magnet 220 of the rotor 200 from penetrating the base 500. A sensing magnet and a sensor which detects a change in magnetic force caused by the sensing magnet may be disposed outside the base 500. A magnetic flux line penetrating the base 500 may affect sensor's sensing. The shield 600 blocks the magnetic flux line so as not to affect the sensor.

The terminal holder 700 is mounted on the base 500 and serves to guide the busbar 900 protruding upward from the inside of the base 500.

The busbar 900 may be disposed on the stator 300. The busbar 900 is electrically connected to the coil 330. In addition, the busbar 900 may be a U-, V-, or W-phase busbar connected to the coil 330, or a power busbar connected to an external power source. The busbar 900 described below is an example of the power busbar.

The busbar holder 800 supports the busbar 900. The busbar holder 800 may be an annular member which accommodates the busbar 900 therein.

The housing 1000 may be disposed outside the stator 300. The housing 1000 may be a cylindrical member having an open one side.

Figure 2:
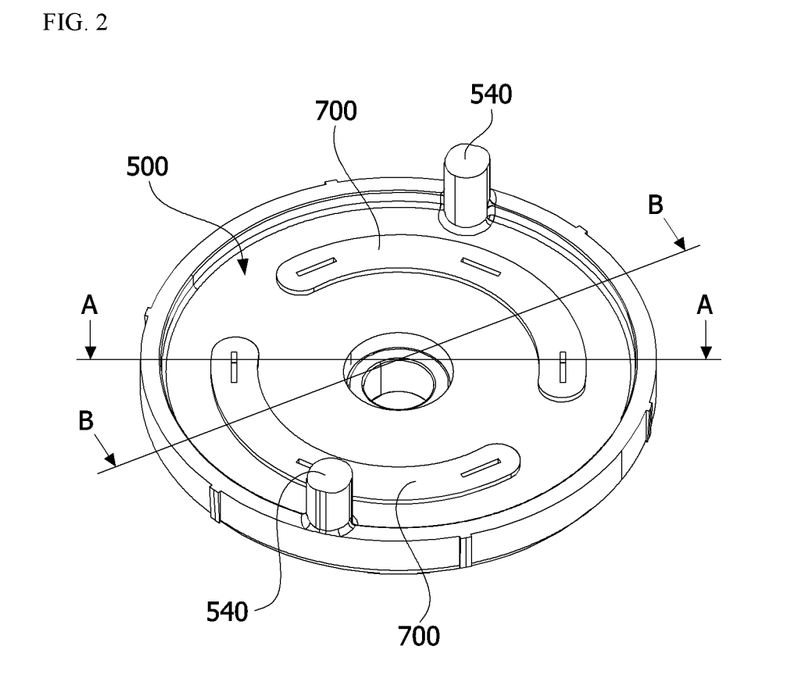
FIG. 2 is a view illustrating a base on which a bearing is disposed.
Figure 3:
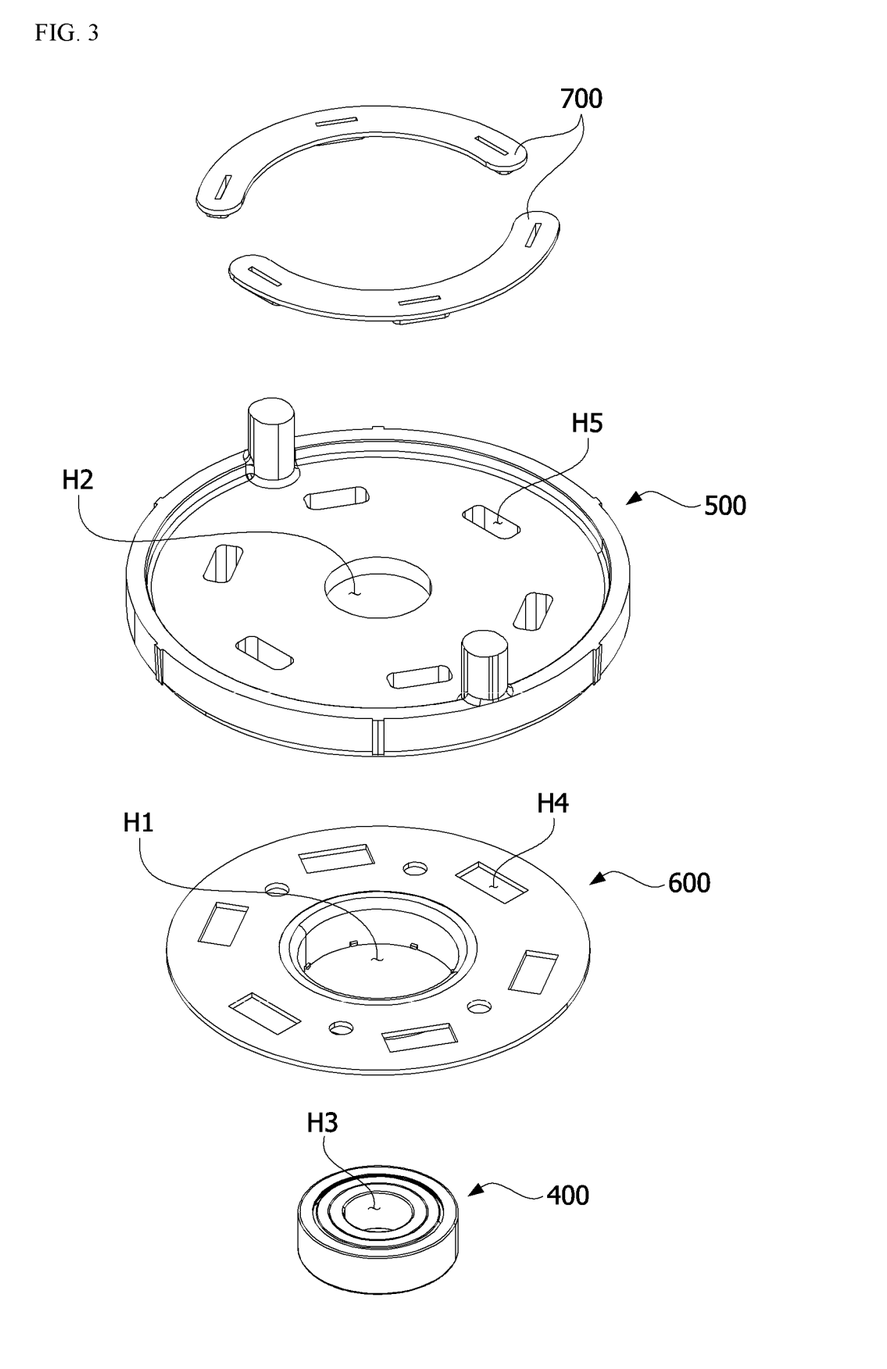
FIG. 3 is an exploded view illustrating the base illustrated in FIG. 2.

FIG. 2 is a view illustrating the base on which the bearing is disposed, and FIG. 3 is an exploded view illustrating the base illustrated in FIG. 2.

Referring to FIGS. 2 and 3, the base 500 and the shield 600 may be integrally molded in an insert injection molding manner. Hereinafter, the base 500 may be referred to as a molding part. Accordingly, a manufacturing process may be simplified by omitting a caulking process or a fastening process using a separate fastening member for mounting the shield 600 on the base 500 and by fixing the shield 600 in a process of molding the base 500.

After the base 500 and the shield 600 are molded in the insert injection molding manner, the bearing 400 may be fixedly press-fitted into the shield 600. Since a material of housing 500 is a resin, it is not suitable for press-fitting the bearing 400 thereinto. Accordingly, the motor according to the embodiment has features that, since a partial region of the shield 600 exposed from the base 500 is used as a region for fixing the bearing 400, the manufacturing process is simplified through an injection process, and the bearing 400 is also stably fixed.

Meanwhile, the terminal holder 700 may be mounted on the base 500. The terminal holder 700 may be mechanically coupled to the base 500. A boss 540 for coupling may be disposed to protrude from the base 500. The boss 540 may be mechanically coupled to an external device.

Figure 4:
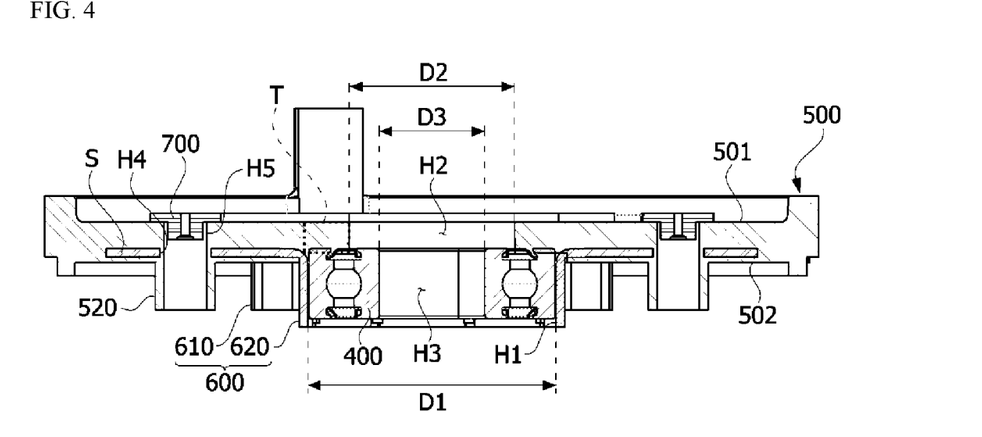
FIG. 4 is a side cross-sectional view illustrating the bearing and the base along line A-A in FIG. 2.

FIG. 4 is a side cross-sectional view illustrating the bearing and the base along line A-A in FIG. 2. Hereinafter, one surface of the base 500 is defined as a surface exposed to the outside of the housing 1000 in an axial direction when the base 500 is coupled to the housing 1000, and the other surface of the base 500 is defined as a surface facing the inside of the housing 1000 in the axial direction.

Referring to FIG. 4, the base 500 may include a second hole H2 through which the shaft 100 passes. In addition, in the shield 600, a first region 610 (flange) and a second region 620 (first protrusion) may be divided.

The first region 610 has an annular plate shape. The first region 610 is disposed in the base 500 and blocks a magnetic flux line generated from the inside of the motor from penetrating the base 500.

The second region 620 may be a cylindrical member bent and extending from an inner side of the first region 610. A first hole H1 is formed in the second region 620. The second region 620 is disposed so that the first hole H1 is aligned and communicated with the second hole H2. An inner diameter D2 of the second hole H2 may be smaller than an inner diameter D1 of the first hole H1. The bearing 400 is fixedly disposed in the first hole H1 of the second region 620. The bearing 400 includes a third hole H3 through which the shaft 100 passes. The diameter D2 of the second hole H2 is greater than a diameter D3 of the third hole H3.

An inner circumferential surface of the second region 620 is in contact with an outer circumferential surface of the bearing 400. The bearing 400 is fixed in the second region 620, and the second region 620 also blocks the magnetic flux line generated from the inside of the motor from emitting outward from the base 500 through the bearing 400 and the first hole H1 of the base 500.

Figure 5:
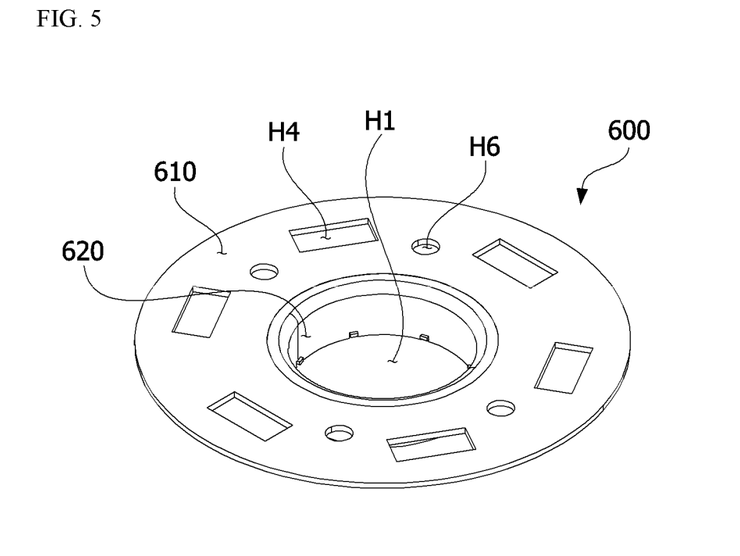
FIG. 5 is a perspective view illustrating a shield.

FIG. 5 is a perspective view illustrating the shield 600.

Referring to FIGS. 4 and 5, the shield 600 may include a plurality of fourth holes H4 disposed in the first region 610. Each of the fourth holes H4 is provided so that the busbar 900 passes through the fourth hole H4. Three fourth holes H4 through which a U-phase busbar, a V-phase busbar, and a W-phase busbar pass may be disposed at regular intervals in a circumferential direction. In the case of a dual-winding type motor in which coils 330 of a stator 300 are electrically separated, since one U-phase busbar 900, one V-phase busbar 900, and one W-phase busbar 900 are further disposed, when three fourth holes H4 are defined as one set, all two sets, that is, six fourth holes H4 may be disposed. The fourth hole H4 may have a rectangular shape in consideration of a shape of the busbar 900.

The base 500 includes a space section S in which the shield 600 is disposed. The first region 610 of the shield 600 is disposed in the space section S. The first region 610 is disposed in the base 500, and the second region 620 is exposed to the outside of the base 500. At least an outer circumferential surface of the second region 620 may be covered by the base 500, but the inner circumferential surface of the second region 620 should be exposed to the outside to be in contact with the bearing 400.

The base 500 may include fifth holes H5. Each of the fifth holes H5 is provided so that the busbar 900 passes through the fifth hole H5 and disposed inside fourth hole H4 of the shield 600. The fifth hole H5 overlaps the fourth hole H4 in the axial direction.

A position of the fifth hole H5 corresponds to the position of the fourth hole H4 of the shield 600. The fifth hole H5 is disposed to pass through the space section S from one surface to the other surface of the base 500. The busbar 900 may pass through the fifth hole H5 from the inside of the base 500 to be exposed to the outside of the base 500.

Figure 6:
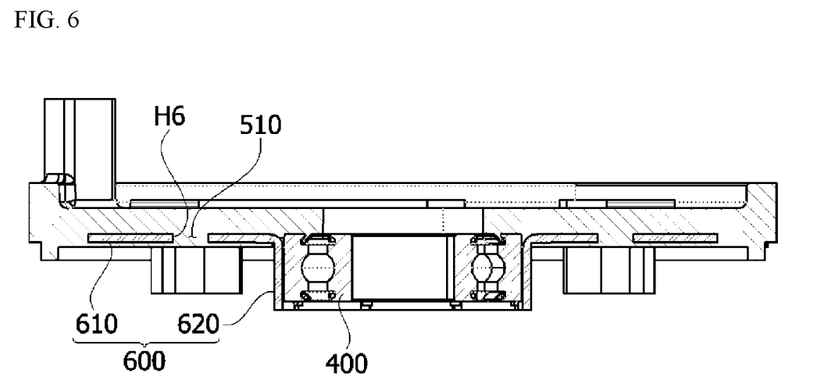
FIG. 6 is a side cross-sectional view illustrating the bearing and the base along line B-B in FIG. 2.

FIG. 6 is a side cross-sectional view illustrating the bearing 400 and the base 500 along line B-B in FIG. 2.

Referring to FIGS. 5 and 6, the shield 600 may include a plurality of sixth holes H6. The sixth holes H6 are to increase a coupling force between the shield 600 and the base 500. During an insert injection molding process, resin fills the sixth holes H6 to form columns 510 disposed in the space section S, and thus the coupling force between the shield 600 and the base 500 can be increased. The sixth holes H6 may be disposed between the adjacent fourth holes H4 in the circumferential direction. A size of each of the sixth holes H6 may be smaller than that of the fourth hole H4. A shape of the sixth hole H6 may be a circular shape.

Figure 7:
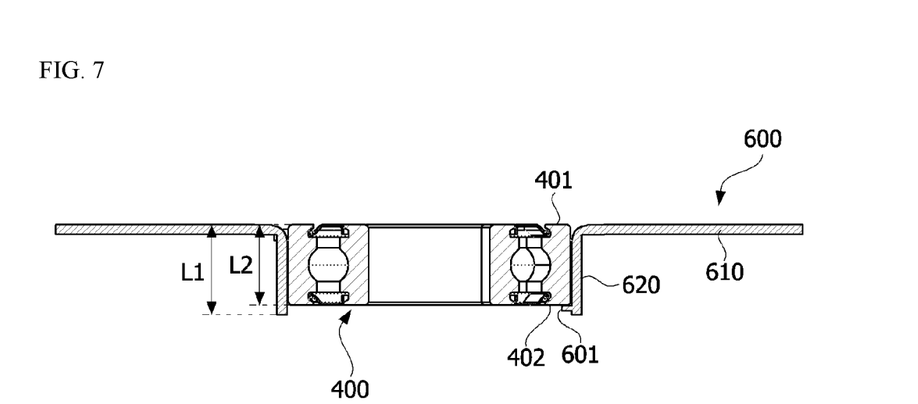
FIG. 7 is a side cross-sectional view illustrating the bearing press-fitted into a second region of the shield.

FIG. 7 is a side cross-sectional view illustrating the bearing 400 press-fitted into the second region 620 of the shield 600.

Referring to FIGS. 4 and 7, the bearing 400 may be press-fitted into the second region 620 of the shield 600. Since the shield 600 is formed of a metal material, a strength for fixing the bearing 400 is secured. In this case, an axial length L1 of the second region 620 may be greater than an axial length L2 of the bearing 400 in order to sufficiently block the magnetic flux line generated from the inside of the motor and flowing toward the bearing 400 and to secure a region for caulking in order to fix the bearing 400 to the second region 620. A protrusion 601 may be disposed on an end of the second region 620 caused by a caulking process. A plurality of protrusions 601 may be disposed along a circumference of the second region 620.

In the axial direction, a first surface 401 of an outer wheel of the bearing 400 is in contact with the base 500 and is supported by the base 500, and one surface 402 of the outer wheel of the bearing 400 is supported by the protrusion 601, and thus the bearing 400 is fixed.

Since the diameter D2 of the second hole H2 of the base 500 is smaller than the diameter of the first hole H1 of the shield 600, a third region T of the base 500 which protrudes inward further than the first hole H1 is formed in a radial direction, and during a caulking process, the third region T may serve to support one surface of the outer wheel of the bearing 400. The diameter D2 of the second hole H2 is appropriately defined so that the third region T does not come into contact with an inner wheel of the bearing 400.

Figure 8:
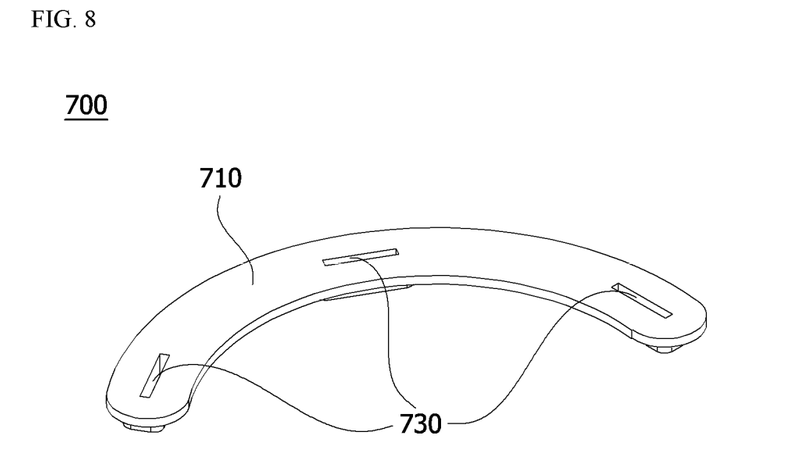
FIG. 8 is a plan view illustrating a terminal holder.
Figure 9:
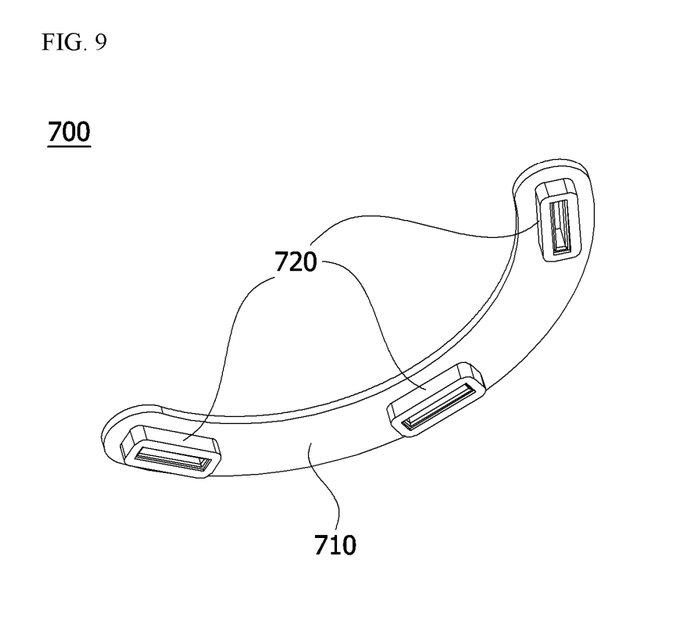
FIG. 9 is a bottom view illustrating the terminal holder.

FIG. 8 is a plan view illustrating the terminal holder 700, and FIG. 9 is a bottom view illustrating the terminal holder 700.

Referring to FIGS. 8 and 9, the terminal holder 700 serves to guide the busbar 900 protruding upward from the inside of the base 500. In addition, the terminal holder 700 covers the fifth hole H5 of the base 500 to inhibit water or foreign matter from entering the inside of the housing 1000 through the fifth hole H5. The terminal holder 700 may be formed of an insulating material.

The terminal holder 700 may include a body 710 and a plurality of second protrusions 720. The body 710 may be an arc-shaped member. The second protrusions 720 may be disposed to protrude from one surface of the body 710. Each of the second protrusions 720 is a region inserted into the fifth hole H5. That is, when the terminal holder 700 is mounted on the base 500, the body 710 is disposed on one surface of the base 500, and the second protrusion 720 may be positioned in the fifth hole H5. A position of the second protrusion 720 corresponds to a position of the fifth hole H5 of the base 500. In addition, the number of second protrusions 720 corresponds to the number of fifth holes H5 of the base 500. For example, when the terminal holder 700 in which three second protrusions 720 are disposed on one body 710 is defined as one set, two sets may be provided, that is, a total of six second protrusions 720 may be disposed.

A slot 730 may be disposed to pass through the body 710 and the second protrusion 720. The slot 730 is a slot through which the busbar 900 protruding upward from the inside of the base 500 passes.

Figure 10:
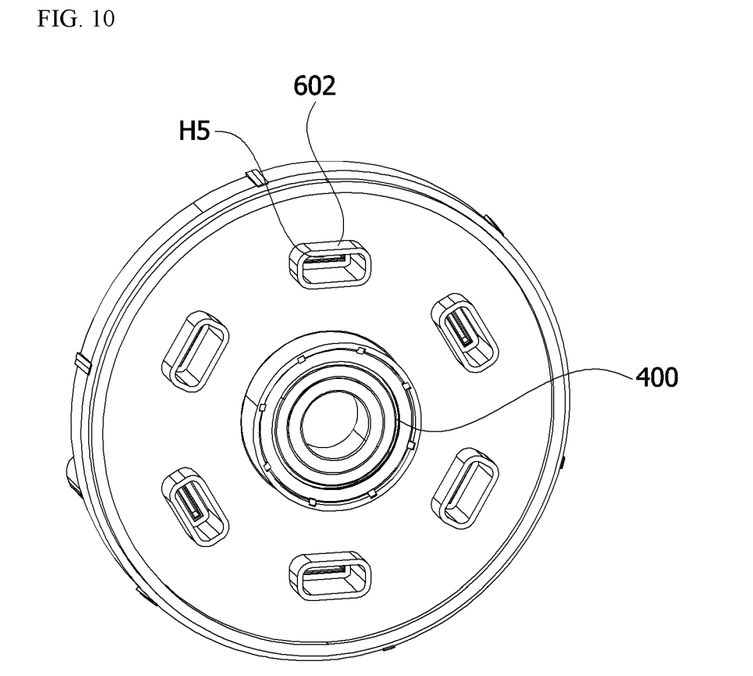
FIG. 10 is a bottom view illustrating the base.

FIG. 10 is a bottom view illustrating the base 500.

Referring to FIG. 10, the base 500 may include a plurality of third protrusions 602 protruding from the other surface of the base 500. Each of the plurality of third protrusions 602 may be disposed along a circumference of the fifth hole H5. The third protrusion 602 serves to guide the busbar 900 protruding upward from the inside of the base 500. The number of third protrusions 602 corresponds to the number of fifth holes H5.

Figure 11:
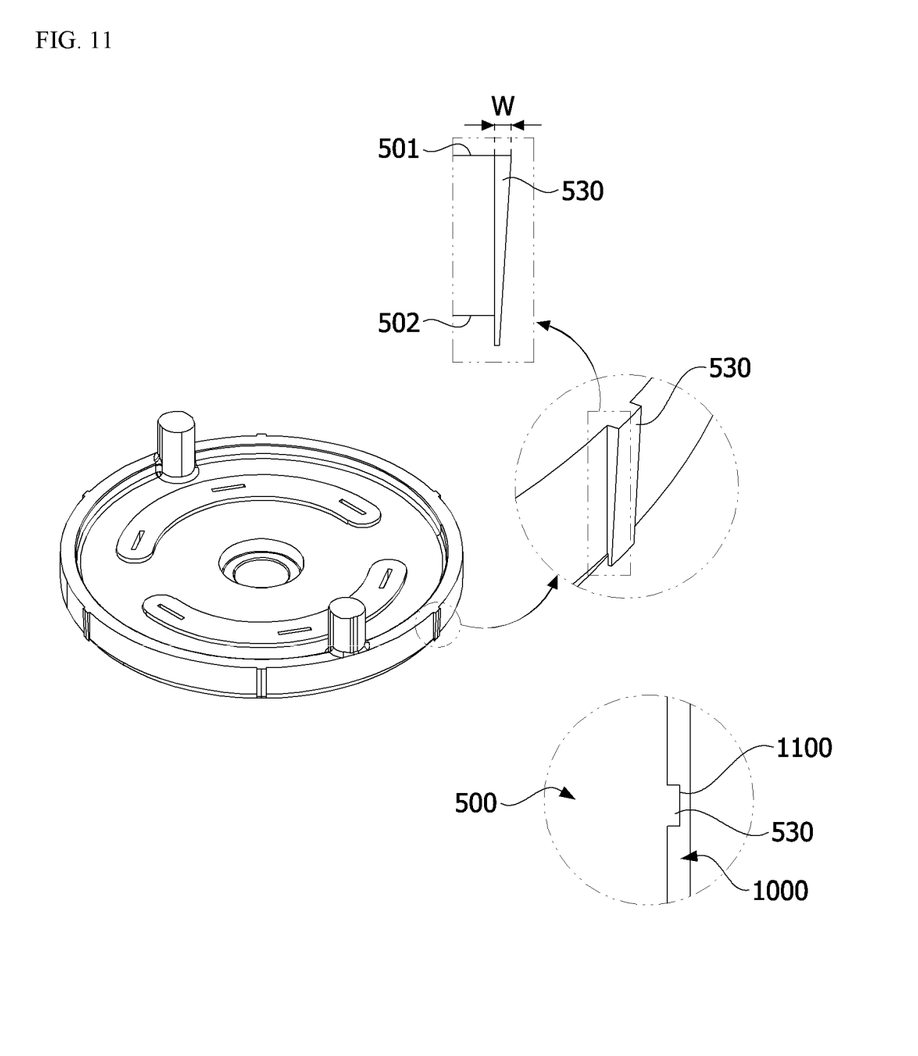
FIG. 11 is a view illustrating a rib of the base.

FIG. 11 is a view illustrating ribs 603 of the base 500.

Referring to FIG. 10, the base 500 may include the ribs 603 disposed to protrude from an outer circumferential surface of the base 500. The ribs 603 are for coupling between the base 500 and the housing 1000. The base 500 is disposed inside the housing 1000. The ribs 603 are press-fitted along an inner circumferential surface of the housing 1000 to couple the base 500 to the housing 1000. The ribs 603 may be disposed at regular intervals along the circumferential direction of the base 500.

Each of the ribs 603 may be formed so that a circumferential width W decreases toward a lower surface 502 from an upper surface 501 of the base 500. The rib 603 having such a shape guides the base 500 to be easily press-fitted along the inner circumferential surface of the housing 1000. Grooves 1100, into which the ribs 603 are inserted, may also be disposed in the inner circumferential surface of the housing 1000.

In the above embodiments, an example of an inner rotor type motor has been described, but the present invention is not limited thereto. The present invention may also be applied to an outer rotor type motor. In addition, the present invention may be used in various devices such as vehicles or home appliances.

What is claimed is:

1. A motor comprising:
   a shaft;
   a bearing which supports the shaft;
   a shield including a first hole through which the shaft passes; and
   a base including a second hole through which the shaft passes,
   wherein the shield includes a first region disposed in the base and a second region extending from the first region, protruding outward from the base, and having the first hole, and
   the bearing is disposed in the first hole,
   wherein the shield includes a plurality of fourth holes disposed in the first region; and the base includes a third protrusion passing through each of the fourth holes.

2. The motor of claim 1, wherein the shield includes a flange inserted into the base and a first protrusion protruding from the flange, and the bearing includes an outer circumferential surface in contact with an inner surface of the first protrusion and a first surface of which at least a part is in contact with the base.

3. The motor of claim 1, wherein the base includes a third region in contact with a part of the bearing and the second hole through which the shaft passes and which has a diameter smaller than a diameter of the first hole.

4. The motor of claim 3, wherein the third region is disposed around the first hole.

5. The motor of claim 3, wherein the third region supports the bearing.

6. The motor of claim 1, wherein: the bearing includes a third hole through which the shaft passes; a diameter of the first hole is greater than a diameter of the second hole; and the diameter of the second hole is greater than a diameter of the third hole.

7. The motor of claim 1, wherein the first region has an annular plate shape and the second region is a cylindrical member bent and extending from an inner side of the first region.

8. The motor of claim 1, wherein the third protrusion includes a fifth hole which overlaps the fourth hole in an axial direction.

9. The motor of claim 1, wherein a terminal holder is mounted in the fifth hole.

10. The motor of claim 1, wherein:
the terminal holder includes an arc-shaped body and a plurality of second protrusions protruding from one surface of the body;
a slot passing through the body and each of the second protrusions is disposed in the terminal holder; and
each of the plurality of second protrusions is coupled to the fifth hole.

* * * * *